June 24, 1930. W. S. SULLIVAN 1,766,005
ROTARY ENGINE
Filed Aug. 2, 1926 7 Sheets-Sheet 1
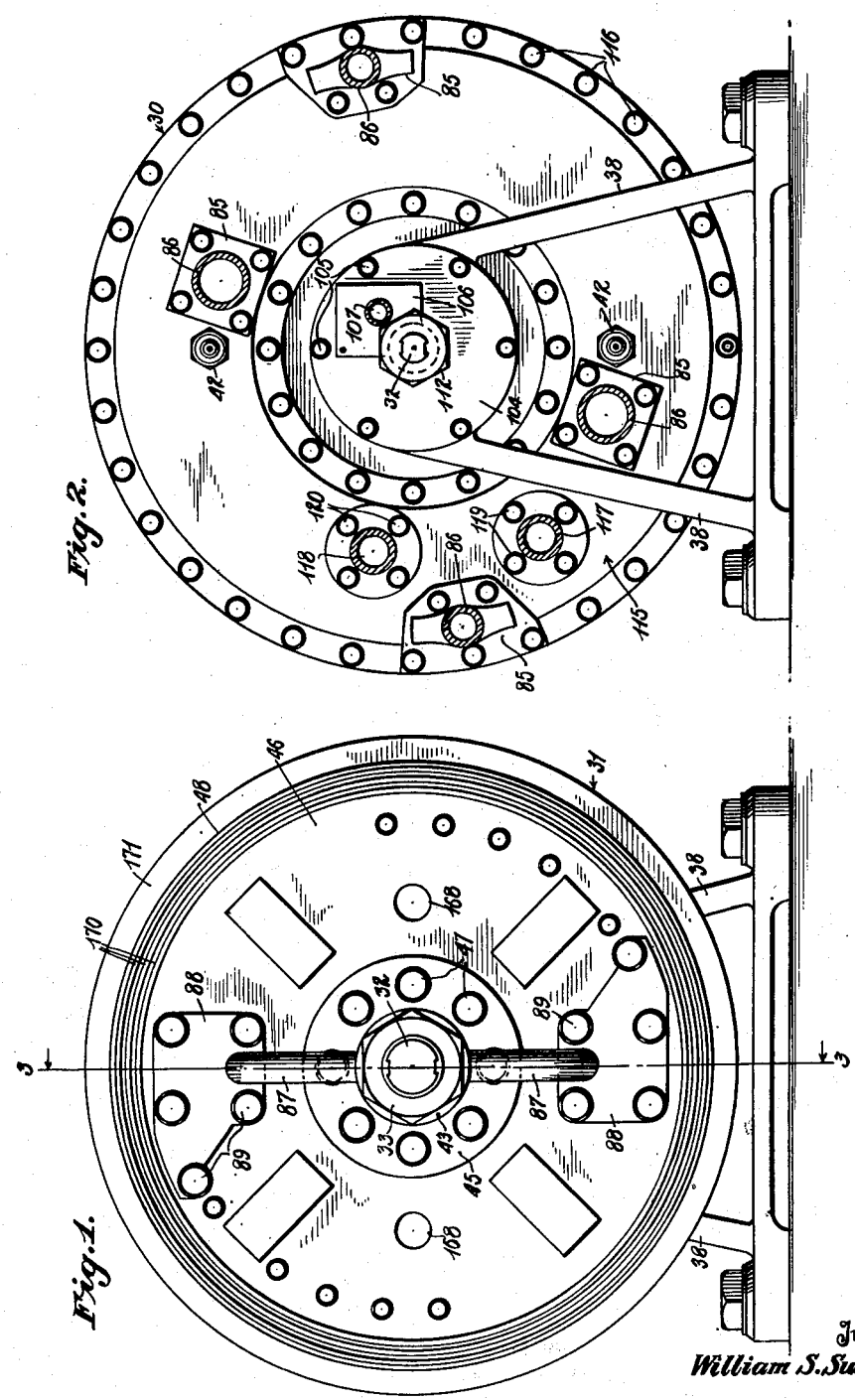
Inventor
William S. Sullivan
By Brown & Phelps
Attorneys

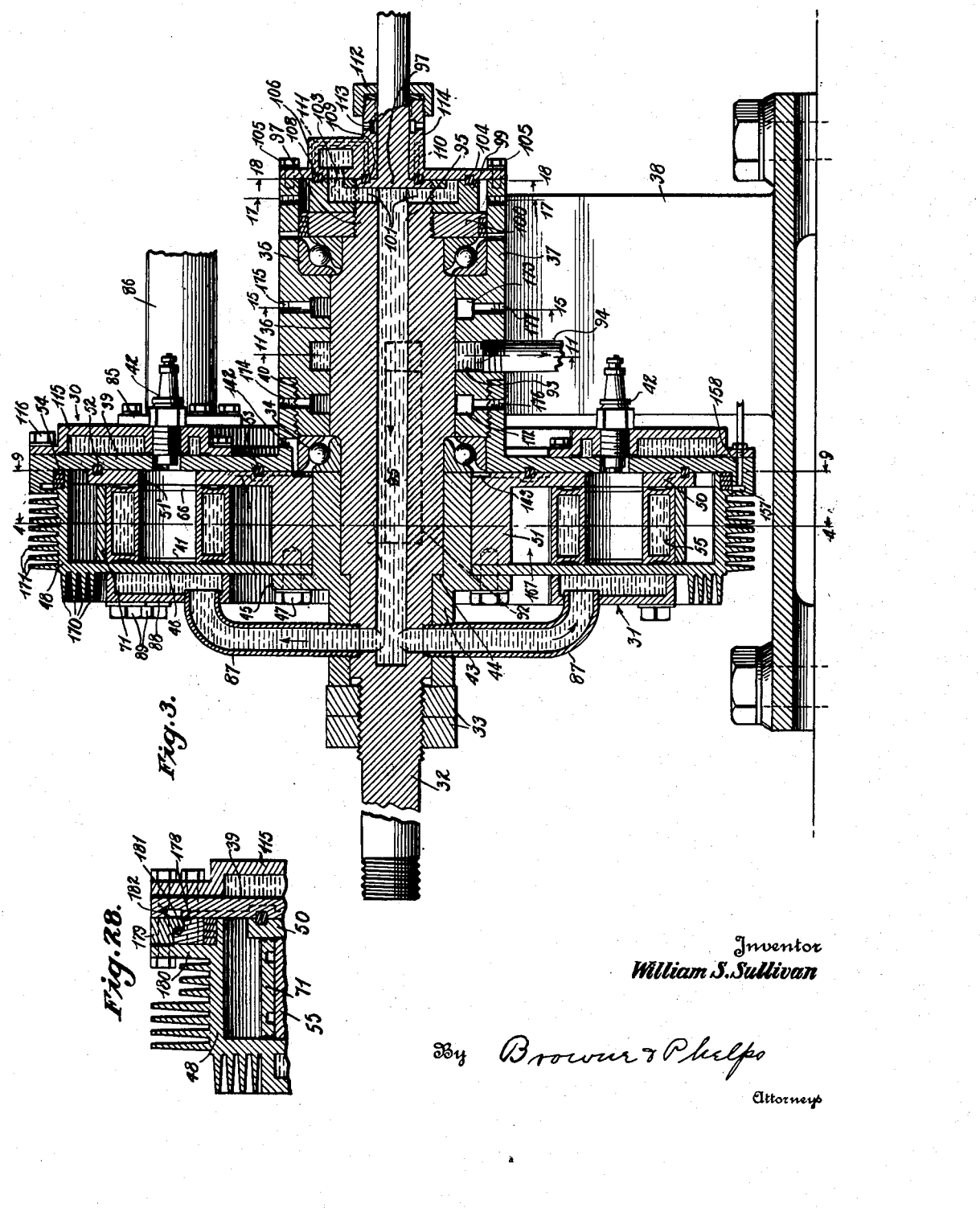

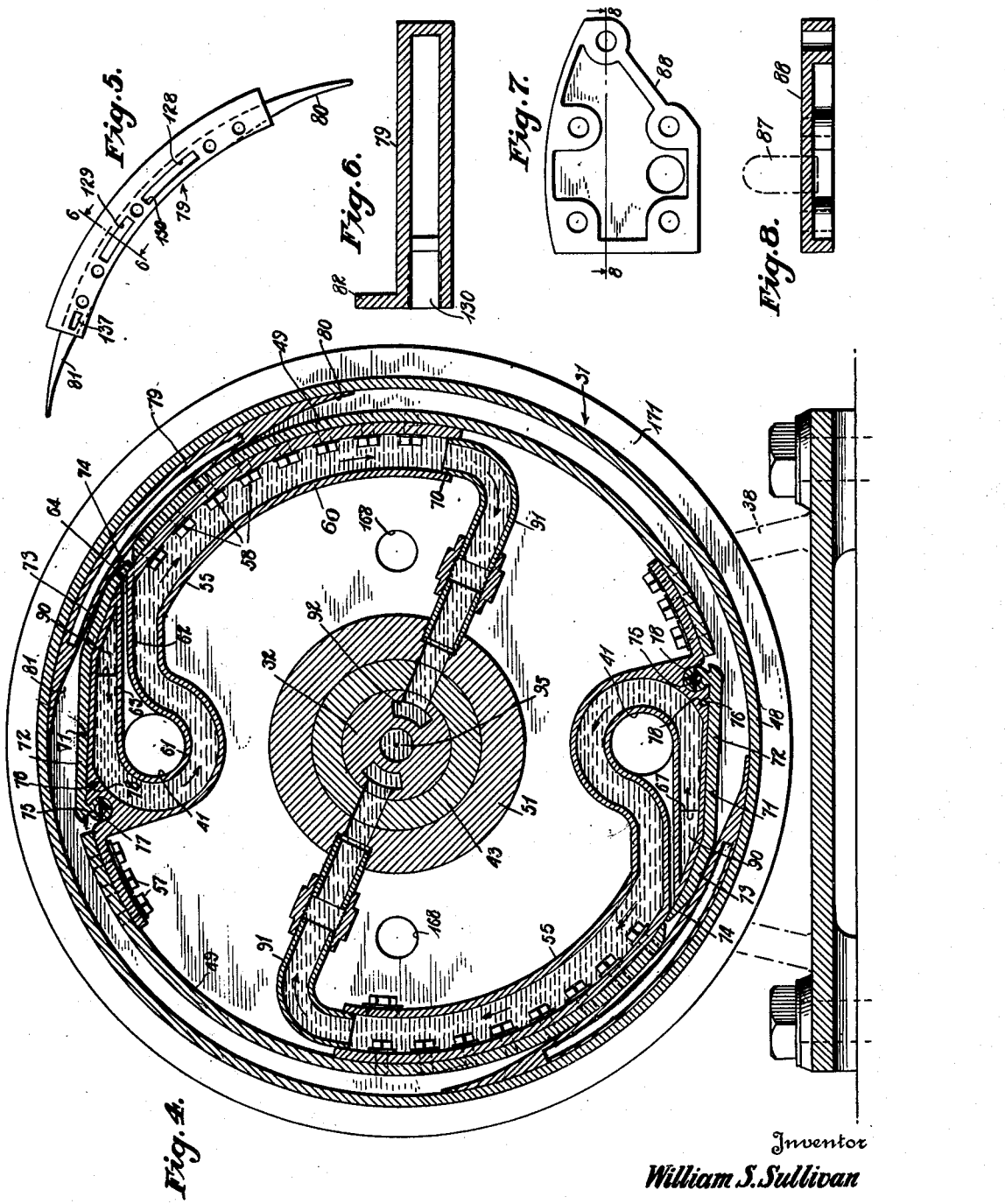

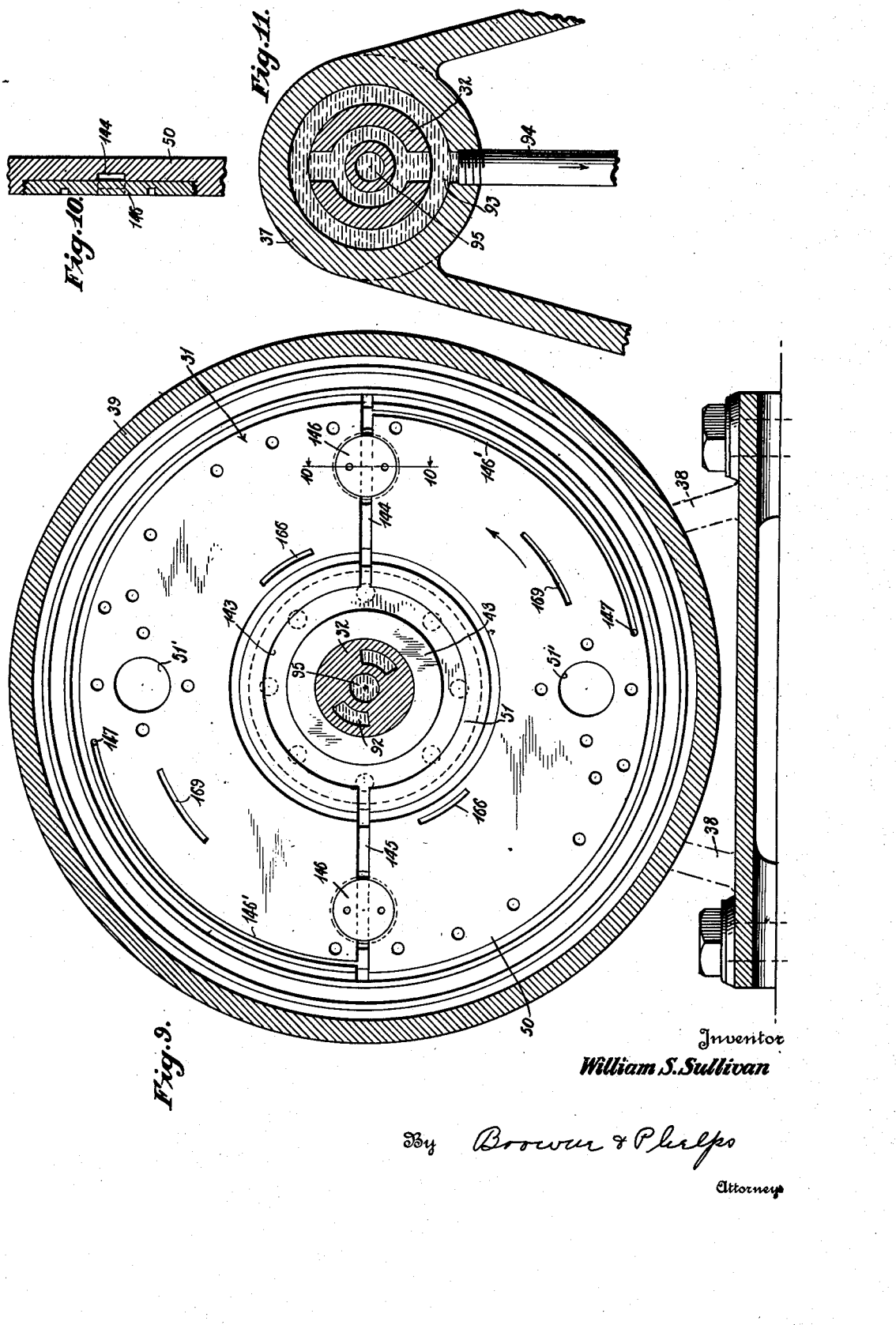

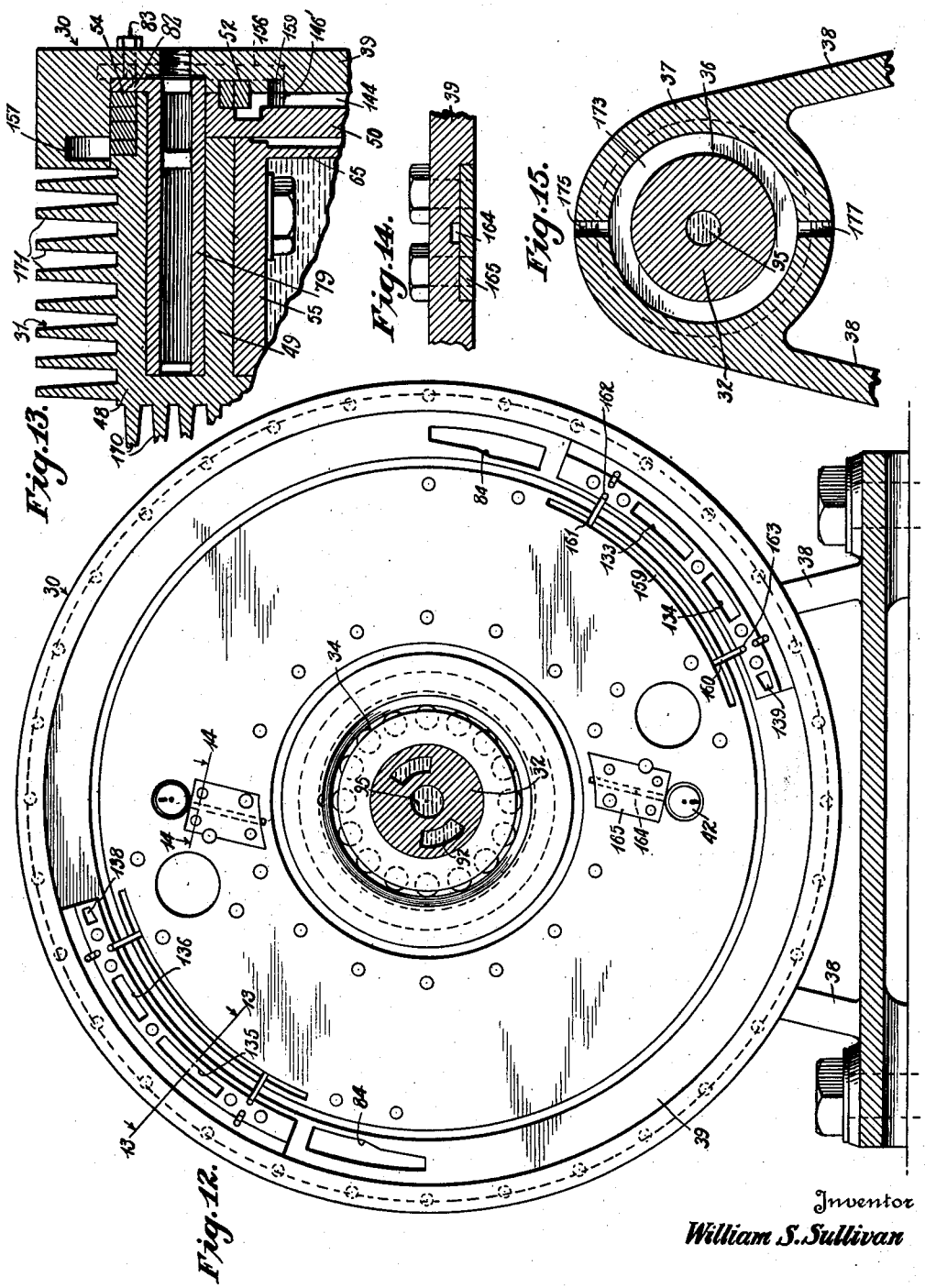

June 24, 1930.  W. S. SULLIVAN  1,766,005
ROTARY ENGINE
Filed Aug. 2, 1926   7 Sheets-Sheet 6
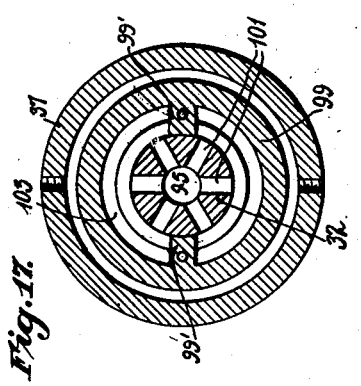
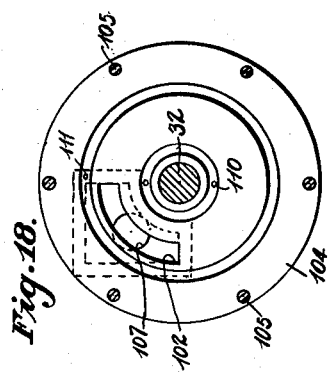
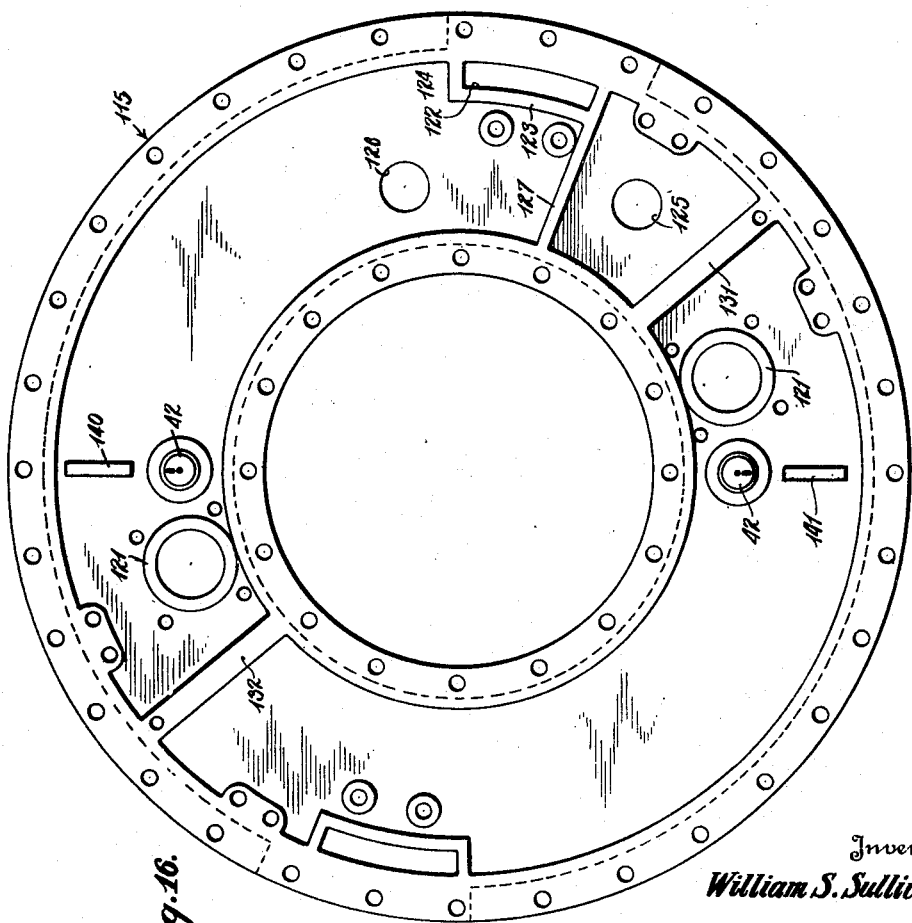
Inventor
William S. Sullivan
By Brower & Phelps
Attorneys

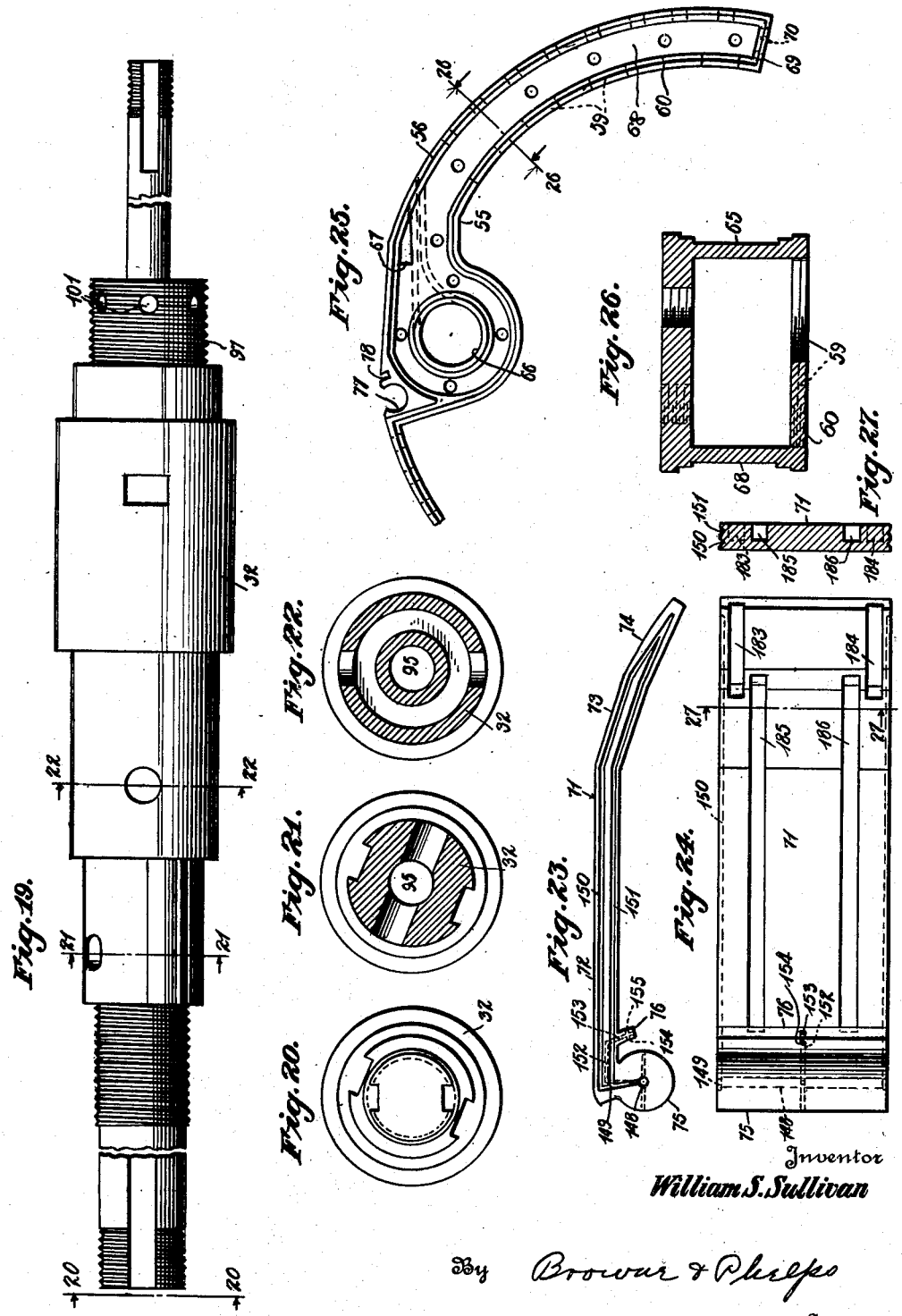

Patented June 24, 1930

1,766,005

UNITED STATES PATENT OFFICE

WILLIAM SHACKELFORD SULLIVAN, OF PHILADELPHIA, PENNSYLVANIA, ASSIGNOR OF FORTY-FIVE PER CENT TO JAMES G. CUMMING, OF WASHINGTON, DISTRICT OF COLUMBIA

ROTARY ENGINE

Application filed August 2, 1926. Serial No. 126,616.

The invention relates to rotary engines and has as an object the provision of an engine of this character which may be operated upon the combustion principle by combustion of a mixture of a fluid fuel and air.

It is an object of the invention to provide an improvement upon the form of device shown in my Patent No. 1,588,632, of June 15, 1926.

It is a further object of the invention to provide an engine which works upon the expanding chamber principle rather than upon the reactance principle as in the case of the invention described and claimed in my former patent referred to.

It is a further object of the invention to provide an engine presenting two concentric discs having relative rotation and placed side by side, there being provided between said discs an annular expansion chamber housing a single moving part.

It is a further object of the invention to provide an engine utilizing a pre-compressed explosive mixture, power from which is derived from the expansion attendant upon its combustion.

It is a further object of the invention to provide water cooling and means for lubrication of the device.

It is a further object of the invention to provide an engine which may be readily disassembled, and wherein the wearing parts may be readily replaced.

It is a further object of the invention to reduce the heat losses to the cooling medium as compared with such losses in reciprocating engines.

It is a further object of the invention to provide an engine having balanced forces.

It is a further object of the invention to provide an engine in which the period of greatest expansion power is utilized in providing torque and wherein the volume of the expansion chamber increases uniformly with the rotation.

Further objects of the invention will appear from the following description when read in connection with the accompanying drawings forming a part of this specification and showing an illustrative embodiment of the invention wherein:

Fig. 1 is a side elevation from the rotor side of the invention;

Fig. 2 is a side elevation from the stator side of the invention;

Fig. 3 is a central vertical section taken on line 3—3 of Fig. 1;

Fig. 4 is a vertical section on line 4—4 of Fig. 3 taken in the direction of the arrow;

Fig. 5 is a side elevation upon an enlarged scale of the cam;

Fig. 6 is a detail section on line 6—6 of Fig. 5 upon a still further enlarged scale;

Fig. 7 is a detail elevation of a water fitting;

Fig. 8 is a detail section on line 8—8 of Fig. 7;

Fig. 9 is a vertical section on line 9—9 of Fig. 3;

Fig. 10 is a detail section on line 10—10 of Fig. 9 upon an enlarged scale;

Fig. 11 is a detail vertical section on an enlarged scale on line 11—11 of Fig. 3;

Fig. 12 is an inner face view of the stator, the shaft of the rotor being also shown, in section;

Figs. 13 and 14 are detail sections upon an enlarged scale on the corresponding lines of Fig. 12, omitting the water jacket;

Fig. 15 is a detail section on an enlarged scale on line 15—15 of Fig. 3;

Fig. 16 is an inner face view of the stator water jacket;

Figs. 17 and 18 are detail sectional views on the corresponding lines of Fig. 3;

Fig. 19 is a side elevation of the shaft of the device;

Fig. 20 is an end view from the left of Fig. 19;

Figs. 21 and 22 are detail sections on the corresponding lines of Fig. 19;

Fig. 23 is a side elevation of the movable piston;

Fig. 24 is a bottom plan view of the movable piston;

Fig. 25 is a side elevation of the combustion chamber separated from the rotor;

Fig. 26 is a detail section on line 26—26 of Fig. 25 on an enlarged scale;

Fig. 27 is a transverse section on line 27—27 of Fig. 24, and

Fig. 28 is a detail section corresponding to a portion of Fig. 3 showing a modified form.

As shown, the device comprises two main elements, a stator indicated in general at 30 and a rotor likewise indicated at 31, the latter supported upon a revoluble shaft 32 and secured thereon as by means of lock nuts 33. To reduce friction, the shaft 32 is indicated as turning in ball bearings 34, 35 designed to take thrust as well as bearing stresses. To this end, the shaft 32 is shown as provided with an enlarged part 36 providing shoulders against which the races of the bearings impinge and the stator is shown as provided with a hub 37 supported by legs 38.

The stator further comprises a disc 39 having screwthreaded engagement at 40 with the hub 37, said disk having openings through which a compressed mixture of air and fuel may be fed to the combustion chamber or chambers 41 mounted in the rotor. Through other openings in the disc 39, the spark plug or spark plugs 42 are provided so as to fire the explosive mixture when the combustion chamber comes opposite thereto, it being understood that a timing apparatus, not shown, is provided to cause the spark at the correct instant.

The rotor is shown as comprising a hub 43 having a shoulder 44 to abut against a complemental shoulder on the shaft 32 and having an annular flange 45 to which an annular plate 46 is secured as by means of cap screws 47.

The plate 46 is shown as carrying an annular ring 48 upon its edge adapted to enclose one side of the combustion and exhaust chambers and a second ring 49 closing the remaining side of said chambers, which ring is interrupted, as shown in Fig. 4, for accommodation of the movable piston and the outlet nozzle from the combustion chambers 41.

The rotor further comprises an annular disc 50 shown as formed integral with an annular hub 51 which is secured to the hub 43 by the cap screws 47 in common with the disc 46. The face of the disc 50 is to be adjusted so as to revolve closely adjacent the inner face of the stator disc 39 with a very slight clearance into which clearance lubrication is fed by means to be described.

The disc 50 is of less diameter than the internal diameter of the ring 48. The disc 50 has an opening or openings 51′ for passage of the fuel to the explosion chambers 41 and for giving access of the spark from plugs 42 when said opening comes opposite the same. At other times the opening 51′ is closed by its proximity to the face of the disc 39.

To prevent leakage from the explosion chambers 41, a pair of rings 52 are placed in registering grooves in the faces of the discs 39 and 50 and other rings 53 of smaller diameter in like grooves.

The rings 52, 53 are split rings of the nature of well-known piston rings and are so fabricated that one ring of each pair will tend to contract slightly while the remaining ring will tend to expand slightly.

To seal the clearance between the disc 39 and the edge of the annular ring 48, piston rings are indicated at 54 seating against a shoulder in the ring 48 and in a groove in the disc 39. At this point there are indicated four piston rings and it is desirable to so fabricate these rings that alternate rings thereof will tend to expand and the remaining to contract, it being understood that these also are split rings.

To enclose the explosion chambers 41 there is shown a separable element, detailed in Figs. 25, and 26, comprising a hollow body 55, the outer wall 56 of which is formed upon an arc fitting within the ring 49 and indicated in Fig. 4 as secured thereto by cap screws 57, 58. To permit of the placing of the cap screws 58, openings 59 are indicated in the wall 60 of the body 55 which may be closed watertight by means of plugs after the application of the cap screws 58.

The body 55 further comprises an inner substantially cylindrical wall 61 extending into walls 62, 63, to provide a nozzle 64 from which the products of combustion may escape into the expansion chamber of the rotor.

The body 55 further comprises an inner wall 65 complete over the entire portion of the body with the exception of a circular opening 66 for ingress of the explosive charge and access of the spark thereto.

An outer wall 68, having an opening 67 for admission of water, completes the body 55 providing a water-tight chamber for water cooling of the explosion chamber to be described.

The end wall 69 of the chamber is provided with a screwthreaded outlet opening 70 for egress of water from the interior of the body 55.

A movable piston is shown at 71, Figs. 4, 23, and 24, comprising a leaf 72 shown as formed at its free end with portions at 73, 74, standing at an angle to the main portion 72 and as having a cylindrical pivotal portion 75 formed integral therewith and also a sealing flange 76. To receive the pivot 75, the body 55 is shown as formed with a journal 77 into which the pivot 75 may be slipped longitudinally when the rotor is disassembled, the body 55 also being provided with a groove 78 to receive the flange 76, the groove and flange being formed upon arcs of the circle concentric with the center of the pivot 75.

The movable piston 71 will be moved outwardly against the interior of the ring 48 both by centrifugal force and by the expansion of propulsive gases and serve to close one side of the expansion chamber provided in the space between rings 48 and 49. To close the remaining side of this ring, a member 79 is provided which is shown in detail in Figs. 5 and 6. This member is shown as formed of an arcuate body and is preferably made hollow as shown in Fig. 6 for the introduction of a cooling medium to be described. The ends 80, 81 are formed tapering so as to act as cams to close piston 71 and to cushion its opening. The outer arcuate surface of the cam fits against the surface of the ring 49 and the inner surface of the cam, between the tapering ends, fits against the ring 48 whereby to prevent leakage of the products of combustion.

As shown in Figs. 5 and 6, the body 79 is formed with a flange 82, which flange is adapted to seat in a groove in disc 39, as disclosed in Fig. 13. To secure the body to the disc 39, cap screws 83 are utilized.

Two bodies 88, two explosion chambers, and two pistons are shown. This number is preferred since the forces of two explosions occurring simultaneously upon diametrically opposite points will balance the forces about the shaft 32. However a larger number may be used if desired, or a single explosion chamber. The determining factor in the number of explosion chambers is the linear travel of the piston after the explosion takes place before the exhaust port is expanded. In a motor of large diameter therefore a greater number than two might be advantageous, but in a motor of small size only one explosion chamber could be used to derive the full value from the fuel.

To exhaust gases, there are shown in Fig. 12, exhaust openings 84 in the stator and exhaust pipe fittings 85 are shown in Fig. 2 for connection of the exhaust pipes 86 thereto. When the piston's travel passes the exhaust opening 84, the gases will flow out of the ports 84 over the edge of disc 50 and will be swept out of this opening by the following piston 71 having an expanding charge behind it.

To cool the walls of the explosion chamber, there are shown pipes 87 in communication with water fittings 88 secured by means of cap screws 89 to the outer face of the rotor, the rotor being formed with openings 90, communicating with the interior of the water fitting 88, admitting water through the openings 67 in the body 55 from which point the water circulates about the cylindrical wall 61 through the opening 70 and escapes through pipes 91 to channels 92 formed in the shaft 32, and by means of an annular groove 93 in the hub 37, the water is drawn off through an outlet pipe 94.

To admit water to the central bore 95 in the shaft 32, the structure shown in Figs. 3, 17, 18, and 19 is provided. As there shown, the reduced end 97 of the shaft 32 is formed with radial openings communicating with the bore 95.

A lock nut 99 screws upon the reduced portion 97 and is provided with an annular groove 103 communicating with a second arcuate slot 102 formed in a cover plate 104 bolted to the hub 37 by means of cap screws 105.

Portions of the material of lock nut 99 are left at 99' to support the ring otherwise severed from the lock nut 99 by the formation of the groove and slots therein.

The cover plate 104 is provided with a box 106 formed integral therewith to which a water supply pipe 107 is connected.

To make the joint between the cover plate 104 and the revolving parts, watertight, there are shown packing rings 108 seating in complementary grooves in the cap 104 and in member 99 and a second pair of grooves 109 seating in grooves in plate 104 and in the reduced end of shaft 32 respectively.

Oil ducts 110, 111 are desirably provided for lubrication of the rings, a stuffing box 112 is indicated and a grease groove 113 upon the interior of the center circular box 114 carried by the cover plate 104.

To cool the disk 39, there is shown a water jacket in the form of a disc 115, the inner face view of which is shown in Figure 16, which disc is formed with an angular flange about its periphery and is secured to disc 39 by means of cap screws 116. To admit water to the water jacket, an inlet pipe is indicated at 117 and an outlet pipe at 118, which pipes are shown as secured to the disc by means of flanged fittings and cap screws 119, 120.

The inlets for fuel are shown as surrounded by annular bosses 121 and the exhaust openings are shown as elongated slots 122 bounded by flanges 123, 124. In Figure 16, the inlet opening in the jacket for admission of water is shown at 125 and the outlet opening at 126.

To cause water in the jacket to flow completely around the stator before passing to the outlet at 126, there is shown a baffle 127 in the form of a radial flange which completely divides the water jacket at this point. It is desired to cause the water during its circulation to flow through the interior of the cams 79 which have been described as hollow for such purpose. To this end, the cams are each provided with an inlet opening 128 and outlet openings 129, 130

137, the interior of the cam being formed with a baffle 130 between these openings.

To cause the water to flow to the cams, there are shown baffles 131, 132, one of which stands between the openings into each of the cams. Slots 133, 134, 135, and 136 are shown through the disc 39 for the passage of water to the interior of each of the cams. Desirably, an additional outlet opening is provided in the cams as shown at 137 and an opening shown at 138, or 139, to allow a portion of the water to flow to a point adjacent the hottest end of the cam before escaping therefrom.

To cause the cooling water to circulate well about the spark plugs, there are shown baffles 140, 141 to deflect the water at these points.

To lubricate the facing surfaces of disc 39 and disc 50, as well as the bearing 34, the piston rings 52, 53, and 54, and the movable piston 71, there is shown a lubrication inlet at 142 to which any desirable fitting may be applied, a channel being provided to connect this opening with an annular groove 143 from which oil may have free access to the ball bearing 34.

To convey oil from the groove 143 there are shown, particularly in Fig. 9, radial grooves 144, 145 adapted to allow oil to flow outwardly therein, which flow will be assisted by centrifugal force.

To conduct the bulk of the oil past the groove accommodating ring 53, a plate is desirably set into the grooves 144, 145, flush with the surface of the disc and under this plate, through the surface of which the ring groove for rings 53 is carried, channels are formed as indicated in dotted lines in Fig. 3.

If the grooves 144, 145 were continuous, the oil therein would escape freely into the explosion chambers 41 when they pass the grooves during the rotation of the rotor.

To close the grooves to these explosion chambers and to still permit oil to pass this zone, the groves are deepened or offset as indicated in Figure 10 and a circular plug 146 is set into the disc 39 flush with the face thereof, preferably being secured therein by screw threads about its periphery.

To feed oil to the pivot of the movable abutment 71, there is shown in Fig. 9, a groove 146' extending circumferentially of the rotor to an oil passage 147 passing through the disc 50 in alignment with the opening 148 in the center of the pivot 75, the abutment 71 having a grove 149 in communication with said opening to the surface of the pivot, which groove in turn communicates with grooves 150 and 151 extending longitudinally in the edge of the piston. A passage 152 is also provided in the body of the piston communicating with the passage 153 in the flange 76, which passage has outlets 154 and 155 opening to the surface of the flange 76.

As shown in Fig. 13, the groove 146' is in communication with a passage 156 opening into the groove for ring 52 and extending behind the base of cam 79 to communicate with the groove for ring 54. Passing among the rings 54, the oil obtains access to the groove 157 from which it may escape through opening 158 of the stator shown at the bottom of Fig. 3, to which opening a fitting, not shown, may be applied, and if desired, suction means may be applied thereto.

To lubricate the surfaces of cam 79, there are shown grooves 159 (Fig. 12) which at certain periods of rotation will be in registry with groove 146', (Fig. 9) which grooves 159 are in communication with passages 160, 161 leading to passages 162, 163 extending into the walls of cam 79 (Fig. 5) and opening to the surface thereof whereby to supply lubricant to the surface of the cam.

After the explosion of fuel by means of the spark plug 42, the cavity in the stator into which the spark plug opens will be full of burned gases which, if allowed to remain therein, would slow down the firing of the subsequent charge. To remove such gas, a groove is provided in the stator, as shown at 164, Fig. 12, which groove is covered with a plate 165 to form a closed passage and a slot 166 is provided opening through the thickness of the rotor disc 50, whereby the burned gases may be discharged into the space 167 in the rotor and finally allowed to escape through breathing holes 168 in the disc 46.

To provide a supply of fresh gas to the space about the spark plugs there are shown grooves 169 in the disc 50 which at a certain portion of the revolution of the rotor provide a communication between the inlet for fuel under pressure and the cavity about the spark plug whereby when the supply of combustible material flows into the explosion chamber a supply will also flow into the spark plug cavity in advance of the spark produced therein.

Desirably cooling fins 170 are provided upon the face of disc 46 and other cooling fins 171 upon the surface of ring 48 to assist their radiation of heat from these portions.

To assist in preventing the water from escaping from groove 93, there are shown annular grooves 172 and 173, to which a supply of heavy grease may be fed by means of fittings, not shown, furnished upon openings 174 and 175, or openings 176, 177 or both such openings.

An alternative form of the rim of the invention is shown in Fig. 28, wherein the disc 39 is extended and thrust rings 178, 179 are shown, the former being bolted to the disc 39 and the latter to the extended flange 180 carried by ring 48. Races for friction reducing balls 181 may be provided in the rings 178, 179, and the rings and balls may be assembled and one of the rings may be secured to its part prior to the application of the rotor to the stator, after which the remaining ring may be secured to the other part. In this manner, any thrust tending to separate the rotor and stator will be taken by the bearing between the rings. In this event, an oil groove 182 is provided in the disc 39 from which the oil may be taken to the bottom of the stator in the manner already described.

The piston 71 is shown in Figures 24, 27, as provided with grooves 183, 184 and grooves 185, 186 staggered therewith so that upon expansion of the piston, the skirt of these grooves may yield, providing a resilient reaction of the piston against the adjacent walls of the stator and rotor.

The operation of the device is briefly as follows: Fuel will be admitted to the explosion chamber 41 when the piston 71 is closed by the cam 79 and will be ignited at the position shown in Figs. 3 and 4 thus building up pressure at the nozzle 64 prior to release of the piston by the cam. This pressure will assist centrifugal force in the opening of the piston and the gases will then flow through the nozzle into the annular chamber. By virtue of groove 169 in the face of the stator the cavity about the spark plug will be supplied with fuel to effect a more ready ignition of the charge and burned gases will be discharged from this cavity through passage 164. The burning gases will expand in the annular chamber until the piston opens the discharge ports 84 just prior to the closure of the piston by the succeeding cam 79, and the burned gases will be swept out of the annular chamber through the port 84 by the next following piston having expanding gases behind it.

Obviously the structure described may be used as a steam or compressed air invention, in which event the spark plugs would be omitted and the fluid under pressure would be admitted to the explosion chambers and the supply immediately cut off during the continued rotation of the rotor, the fluid then acting by expansion until exhausted. In this event the openings 51' and 66 might, if desired, be elongated to retard the cut off and to use a less expansion of fluid and a greater admission thereof to any desirable extent.

The invention when worked as an internal combustion engine may have its power varied within wide limits by variation in the pressure of the explosive mixture fed thereto thus securing all the advantages of the super charger sometimes used with reciprocating engines.

Minor changes may be made in the physical embodiment of the invention within the scope of the appended claims without departing from the spirit thereof.

I claim:

1. A rotary engine comprising, in combination, a stator having an axis and a face substantially perpendicular thereto, a rotor mounted to revolve about said axis and having a face revoluble closely adjacent said face of the stator and having an annular chamber and an explosion chamber opening to said face, a movable piston mounted in a wall of the chamber adapted to close said chamber to form one side of an expansion chamber, means carried by said stator and projecting into said chamber to form a second side of an expansion chamber, said faces having inlet ports adapted to come into registry with said explosion chamber during revolution of the rotor, a supply pipe for combustible fluid secured to the stator in communication with its inlet port, said stator face having an exhaust port opening into said annular chamber adapted to exhaust the products of combustion when passed by said piston.

2. A rotary engine comprising, in combination, a stator and a rotor having circular faces relatively revoluble in close proximity, said rotor having an annular expansion chamber, an inlet port in the face of the stator in communication with said chamber at a certain period of the revolution, said rotor face having a radial oil groove, means to introduce oil into the axial end of said groove and means to prevent escape of oil into said inlet port during passage of the groove radius.

3. A rotary engine comprising, in combination, a stator and a rotor having faces relatively revoluble, said rotor having an explosion chamber opening to its face, said stator face having an inlet port and a spark plug cavity adapted to register in turn with the explosion chamber, said rotor face having a groove adapted to place said port and cavity in communication prior to registry of said cavity and chamber, said rotor face having an exhaust slot radially offset from the zone of the cavity and the stator face having a passage in communication with the cavity and opening to the face of the stator in the zone of the slot.

4. A rotary engine comprising, in combination, a stator having an axis and a face substantially perpendicular thereto, a rotor mounted on said axis and having a face revolving closely adjacent the face of said stator, said rotor having an annular chamber opening through its face, a stationary element carried by the stator projecting into said chamber to obstruct the same at one point, a movable element carried by the rotor adapted to be moved into said chamber to obstruct the same at a second point, said rotor provided with an explosion chamber opening to said face and to said annular chamber, said stator provided with a port to admit an explosive mixture to said explosion chamber and with means to ignite said mixture.

5. A rotary engine comprising, in combination, a stator, a rotor mounted to revolve closely adjacent a face of said stator having an annular chamber, a movable piston hinged to the rotor adapted to obstruct a portion of said chamber and urged to obstructing position by centrifugal force, stationary means projecting into the chamber to obstruct a second portion thereof coacting with said piston to enclose an expansible chamber, said rotor carrying an explosion chamber opening into the thus closed space below said piston in its retracted position, and having an inlet port, said stator having a port adapted to come into registry with said inlet port to deliver an explosive mixture thereto and means to ignite the mixture in said explosion chamber, while the piston is held in retracted position by said stationary means whereby pressure of the products of combustion aid centrifugal force in opening said piston to chamber closing position.

WILLIAM SHACKELFORD SULLIVAN.